United States Patent [19]

Barnes

[11] Patent Number: 5,138,772
[45] Date of Patent: Aug. 18, 1992

[54] REFERENCE POINT ASSEMBLY

[76] Inventor: Jock Barnes, 25335 Pineview, Warren, Mich. 48091

[21] Appl. No.: 714,834

[22] Filed: Jun. 13, 1991

[51] Int. Cl.⁵ .......................... G01D 21/00; B32Q 1/08
[52] U.S. Cl. ........................................ 33/613; 269/50; 269/317; 33/644; 33/573
[58] Field of Search ................. 33/613, 614, 644, 676, 33/679, 568, 570, 573; 269/315, 317, 310, 900, 47, 50, 52, 903; 29/559

[56] References Cited

U.S. PATENT DOCUMENTS

| | | | |
|---|---|---|---|
| 2,809,439 | 10/1957 | Ringgold | 33/676 |
| 3,641,666 | 2/1972 | Scaminac, Jr. et al. | 269/47 |
| 3,793,738 | 2/1974 | Blakey . | |
| 3,906,607 | 9/1975 | Gusev | 269/52 |
| 3,918,694 | 11/1975 | Laudick | 269/47 |
| 4,500,079 | 2/1985 | Morghen | 269/47 |
| 4,505,046 | 3/1985 | Shonka | 33/614 |
| 4,601,110 | 7/1986 | Donaldson . | |
| 4,700,488 | 10/1987 | Curti | 33/613 |
| 4,741,523 | 3/1988 | Sato et al. | 269/317 |
| 4,805,316 | 2/1989 | Curti | 33/613 |
| 4,834,358 | 5/1989 | Okolischan et al. | 269/900 |
| 4,986,006 | 1/1991 | Weaver | 33/613 |

FOREIGN PATENT DOCUMENTS

| | | | |
|---|---|---|---|
| 2315724 | 10/1974 | Fed. Rep. of Germany | 269/310 |
| 0639681 | 12/1978 | U.S.S.R. | 269/310 |
| 2124129 | 2/1984 | United Kingdom | 269/317 |

*Primary Examiner*—Thomas B. Will
*Attorney, Agent, or Firm*—Gifford, Groh, Sprinkle, Patmore & Anderson

[57] ABSTRACT

A reference point assembly is provided for use with an inspection table in which the reference point assembly is mounted to the table and adapted to engage an elongated slot on a part under inspection and, in doing so, accurately position the slot with respect to the reference point assembly and thus to the table. The reference point assembly includes a pin movable between a retracted and an extended position with respect to the table. The pin has two tapered surfaces on opposite sides which engage opposite sides of the slot and, in doing so, center the slot with respect to the pin in a first direction. Similarly, a ramp assembly is also movable between a retracted and an extended position with respect to the table. The ramp assembly includes a pair of ramp surfaces adapted to engage opposite ends of the slot end, in doing so, center the slot with respect to the ramp assembly in a second direction which is substantially perpendicular to the first direction. A pair of springs urge both the pin and the ramp assembly toward their extended position.

4 Claims, 1 Drawing Sheet

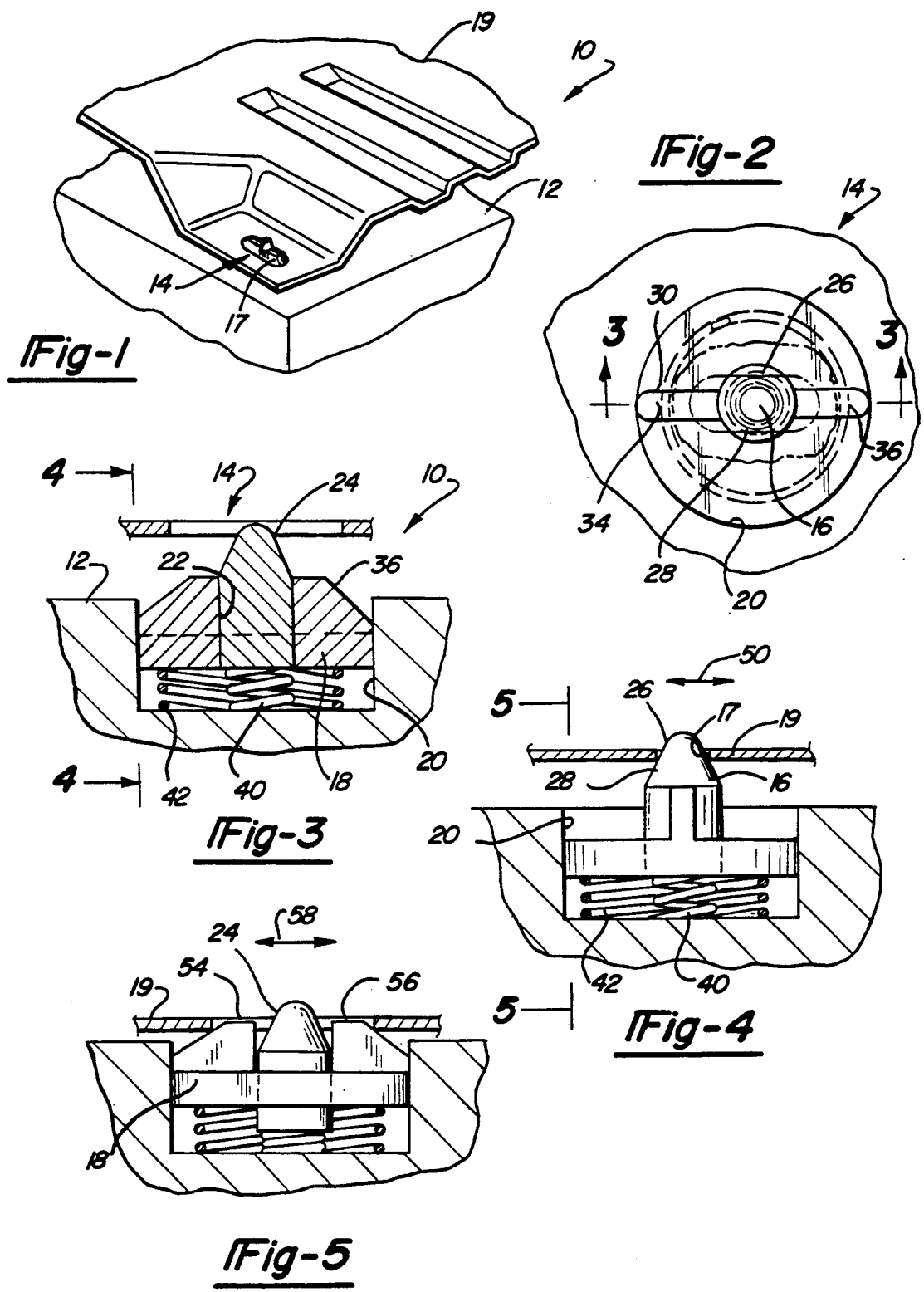

REFERENCE POINT ASSEMBLY

BACKGROUND OF THE INVENTION

I. Field of the Invention

The present invention relates to a reference point assembly for use with an inspection table.

II. Description of the Prior Art

In manufacturing operations, it is conventional to periodically measure the manufactured components for quality control purposes. Typically, the component under inspection is placed on a reference table and then measured to assure that the dimensions of the component are within the prescribed manufacturing tolerances.

In order to accurately measure the component on the inspection table, the inspection table typically includes a reference point locator or pin which protrudes upwardly from the table. The component under inspection includes an elongated slot which is positioned over the reference point locator. Since the position of the reference point locator is known, positioning the locator through the component slot accurately positions the component with respect to the inspection table thereby facilitating the quality control inspection.

One disadvantage of these previously known reference point locators is that, due to manufacturing tolerances of the component under inspection, there is some play between the reference point locator and the slot on the component under inspection. When this occurs, the reference point locator fails to center itself with respect to the component slot. This in turn creates discrepancies and errors during the quality control inspection of the component.

SUMMARY OF THE PRESENT INVENTION

The present invention provides a reference point assembly for use with an inspection table which overcomes all of the above mentioned disadvantages of the previously known reference point locators.

In brief, the reference point assembly of the present invention comprises a pin which is movable between a retracted and an extended position with respect to the table. The pin includes tapered surfaces on opposite sides which are adapted to engage opposite sides of the slot on the component as the component is positioned on the inspection table. Consequently, as the slot is positioned over the pin, the pin centers the slot with respect to the pin in a first horizontal direction. A spring urges the pin to its extended position in which the pin protrudes upwardly from the table.

The reference point assembly also includes a ramp assembly which is movable between a retracted and an extended position with respect to the inspection table. The ramp assembly includes a pair of ramp surfaces which are adapted to engage the opposite ends of the slot as the component slot is positioned over the ramp assemblies as well as the pin. The ramp surfaces, by engaging the opposite ends of the slot thus center the ramp assembly with respect to the slot in a direction which is substantially perpendicular to the first direction. A second spring also urges the ramp assembly towards its extended position.

In operation, as the part under inspection is positioned over the reference point assembly, the pin and ramp surfaces automatically center the component slot with respect to the reference point assembly and thus with respect to the inspection table. Quality control inspection of the component can then take place without the previously known errors introduced by play between the component slot and the locator point.

BRIEF DESCRIPTION OF THE DRAWING

A better understanding of the present invention will be had upon reference to the following detailed description when read in conjunction with the accompanying drawing, wherein like reference characters refer to like parts throughout the several views, and in which:

FIG. 1 is an elevational view illustrating a preferred embodiment of the present invention;

FIG. 2 is a top plan view of the preferred embodiment of the present invention;

FIG. 3 is a sectional view taken substantially along line 3—3 in FIG. 2;

FIG. 4 is a view taken substantially along line 4—4 in FIG. 3 and illustrating the operation of the preferred embodiment of the present invention; and FIG. 5 is a view taken substantially along line 5—5 in FIG. 4 and also illustrating the operation of the preferred embodiment of the present invention.

DETAILED DESCRIPTION OF A PREFERRED EMBODIMENT OF THE PRESENT INVENTION

With reference first to FIG. 1, an inspection table 10 having a flat upper surface 12 is thereshown for quality control purposes. A reference point assembly 14, which will be subsequently described in greater detail, is mounted to the reference table 10 so that a portion of the assembly 14 protrudes upwardly from the surface table 12. As will also subsequently be described in greater detail, the assembly 12 engages a slot 17 in a component or part 19 under inspection and, in doing so, accurately positions the part 19 with respect to the assembly 14. Various quality control inspections and measurements are then performed on the part 19.

With reference now to FIGS. 2 and 3, the reference point assembly 14 is thereshown in greater detail and comprises a pin 16 and ramp assembly 18 which are positioned within a cylindrical recess 20 formed in the top surface 12 of the inspection table 10. The position of the cavity 20, furthermore, is precisely predetermined with respect to the table 10.

Still referring to FIGS. 2 and 3, the pin 16 is slidably mounted within a bore 22 formed in the ramp assembly 18. Additionally, the pin 16 has a conical top 24, best shown in FIG. 3, thus forming two tapered surfaces 26 and 28 (FIG. 2) on opposite sides of the top 24 of the pin 16.

The ramp assembly 18 includes a pair of outwardly extending ramps 30, each of which has an upper surface 34 and 36, respectively, which slopes or tapers downwardly from the pin 24. Furthermore, as best shown in FIG. 2, each tapered ramp surface 34 and 36 extends in a direction which is substantially perpendicular to the tapered surfaces 26 and 28 on the pin 16.

As best shown in FIG. 3, a first spring 40 urges the pin 16 towards an extended position in which the pin 16 protrudes upwardly from the top surface 12 of the inspection table 10. The spring 40, however, allows the pin 16 to move to a retracted position in which the spring 40 is compressed and a greater portion of the pin 16 is retracted into the table cavity 20.

Similarly, a second spring 42 urges the ramp assembly 18 to an extended position in which the ramp assembly 18 also protrudes above the table surface 12. The spring 42, like the spring 40, allows the ramp assembly 18 to be retracted more so into the table cavity 20. Furthermore, both the pin 16 and ramp assembly 18 are independently movable with respect to each other.

With reference now to FIG. 4, in operation the slot 17 in the part 19 under inspection is first positioned over the pin 16. In doing so, the tapered surfaces 26 and 28 on the pin 16 engage opposite sides of the slot 17 and, in doing so, centers the part 19 with respect to the pin 16 along a first direction 50.

The part 19 under inspection is then pressed towards the top surface 12 of the table 10 and, in doing so, the spring 40 compresses and allows the pin 16 to move towards its retracted position. As the pin 16 moves towards its retracted position, however, the pin 16 maintains the sides of the slot 17 centered with respect to the direction 50.

With reference now to FIG. 5, as the part 19 is moved towards the top 12 of the table 10, the tapered surfaces 34 and 36 of the ramp assembly 18 engage the ends 54 and 56 of the slot 17. In doing so, the tapered surfaces 34 and 36 of the ramp assembly 18 center the slot 17 with respect to the ramp assembly 18 in the direction 58 which is substantially perpendicular to the direction 50. Consequently, since the part slot 17 is centered with respect to the reference point assembly in both the direction 50 and the direction 58, the part 19 under inspection is accurately positioned with respect to the pin 16 and ramp assembly 18 and thus with respect to the table 10. Accurate quality control measurements or the like can then be performed and on the part 19.

Having described my invention, many modifications thereto will become apparent to those skilled in the art to which it pertains without deviation from the spirit of the invention as defined by the scope of the appended claims.

I claim:

1. A reference point assembly for use with an inspection table, said reference point assembly being mounted to the table and adapted to engage an elongated slot on a part under inspection and, in doing so, accurately position the slot with respect to the reference point assembly, said slot having two sides, two ends and a predetermined width and length, said reference point assembly comprising:

a pin movable between a retracted and an extended position with respect to the table, said pin having tapered surfaces on opposite sides, said tapered surfaces being adapted to engage opposite sides of the slot and, in doing so, center the slot with respect to the pin in a first direction, means for urging said pin towards its extended position, a ramp assembly movable between a retracted and an extended position with respect to the table, said ramp assembly having a pair of ramp surfaces adapted to engage the opposite ends of the slot, and, in doing so, center the slot with respect to the ramp assembly in a second direction substantially perpendicular to said first direction, and means for urging said ramp assembly towards its extended position.

2. The invention as defined in claim 1 wherein said pin is positioned between the ramp surfaces on said ramp assembly.

3. The invention as defined in claim 2 wherein said pin is substantially conical in shape having a diameter at its base greater than the width of the slot.

4. The invention as defined in claim 2 wherein said ramp surfaces of said ramp assembly slope downwardly from opposite sides of said pin.

* * * * *